United States Patent
Belliveau

(10) Patent No.: US 9,440,491 B1
(45) Date of Patent: Sep. 13, 2016

(54) TIRE LIFT CADDY

(71) Applicant: Tire Lift Caddy Inc., Sussex Corner (CA)

(72) Inventor: Dennis Belliveau, Sussex Corner (CA)

(73) Assignee: TIRE LIFT CADDY INC., Sussex Corner (CA)

( * ) Notice: Subject to any disclaimer, the term of this patent is extended or adjusted under 35 U.S.C. 154(b) by 0 days.

(21) Appl. No.: 14/545,821

(22) Filed: Jun. 24, 2015

Related U.S. Application Data

(60) Provisional application No. 62/125,129, filed on Jan. 14, 2015.

(51) Int. Cl.
*B60B 30/10* (2006.01)
*B66F 11/00* (2006.01)

(52) U.S. Cl.
CPC ............... *B60B 30/10* (2013.01); *B66F 11/00* (2013.01)

(58) Field of Classification Search
CPC ..................................................... B60B 30/10
USPC ........................................ 414/426, 427, 429
See application file for complete search history.

(56) References Cited

U.S. PATENT DOCUMENTS

| | | | |
|---|---|---|---|
| 1,275,716 A | 8/1918 | Maurer, Jr. | |
| 1,361,889 A | 12/1920 | Miller | |
| 2,259,365 A * | 10/1941 | De Forest | B66F 5/02 254/5 R |
| 2,332,443 A | 10/1943 | Foringer | |
| 2,349,251 A | 5/1944 | Domoj | |
| 2,362,981 A | 11/1944 | Baum | |
| 2,380,415 A | 7/1945 | Carruthers | |
| 2,565,869 A * | 8/1951 | Marschke | B60B 29/002 114/77 R |
| 2,576,627 A * | 11/1951 | Miner | B60B 29/001 414/427 |
| 2,647,648 A * | 8/1953 | Ribarich, Jr. | B60B 29/001 254/5 R |
| 2,812,086 A * | 11/1957 | Kuenzi | B60B 29/002 414/429 |
| 3,292,902 A | 12/1966 | Lynch | |
| 4,690,605 A | 9/1987 | Coccaro | |
| 4,692,082 A | 9/1987 | Smith | |
| 4,976,449 A * | 12/1990 | Lotspeich | B60B 29/002 254/2 R |
| 5,096,161 A | 3/1992 | Tomasevic | |
| 6,098,961 A | 8/2000 | Gionet | |
| 6,789,994 B2 | 9/2004 | Tortellier | |
| 6,860,496 B2 | 3/2005 | Novak et al. | |
| 7,097,406 B1 | 8/2006 | Gang | |
| 7,232,138 B2 | 6/2007 | Shubert | |
| 7,597,524 B2 * | 10/2009 | Hernandez | B60B 29/002 414/426 |
| 8,910,957 B1 | 12/2014 | Hassell | |

(Continued)

FOREIGN PATENT DOCUMENTS

| | | |
|---|---|---|
| CA | 200020 | 5/1920 |
| CA | 1287041 | 7/1991 |

(Continued)

*Primary Examiner* — Jonathan Snelting
(74) *Attorney, Agent, or Firm* — Mario Theriault

(57) ABSTRACT

This tire lift caddy has a rectangular frame supported on casters, and a pair of rollers mounted therein across the frame. The rollers are guided along a respective pair of inclined slots in the side of the frame. A threaded rod extends along a length of the frame. A pair of push bar assemblies are mounted to the threaded rod and to the axles of said rollers for moving the rollers in unison along the slots upon a rotation of the threaded rod. The threaded rod has a left-hand thread thereon and a cylindrical handle on a working end thereof. The cylindrical handle can be worked with the palm of the hand, or finely adjusted with the fingers to raise the rollers to a desired level. The rollers have a central groove in surfaces thereof for nesting the threaded rod therein when the rollers are in their lowermost positions.

18 Claims, 2 Drawing Sheets

(56) References Cited

U.S. PATENT DOCUMENTS

| | | |
|---|---|---|
| 2001/0038094 A1 | 11/2001 | Lundy, Sr. et al. |
| 2004/0146384 A1* | 7/2004 | Whelan ............... B60S 13/00 414/426 |
| 2005/0254923 A1* | 11/2005 | Gorski ............... B62B 3/104 414/426 |
| 2007/0138112 A1* | 6/2007 | Meyer ............... B60B 29/00 211/24 |
| 2009/0191035 A1* | 7/2009 | LaBruyere ............ B62B 5/0083 414/427 |

FOREIGN PATENT DOCUMENTS

| | | |
|---|---|---|
| CA | 2032119 | 6/1992 |
| CA | 2105036 | 2/1995 |
| CA | 2325175 | 5/2001 |
| CA | 2625141 | 9/2007 |

* cited by examiner

TIRE LIFT CADDY

This application claims the benefit of U.S. Provisional Patent Application No. 62/125,129, filed Jan. 14, 2015.

FIELD OF THE PRESENT INVENTION

The present invention pertains to the field of wheel lifting devices, and more particularly, it pertains to a wheel lifting device having two wheel support rollers which remain angularly stationary during the lifting movement thereof.

BACKGROUND OF THE PRESENT INVENTION

When a wheel is being installed on a vehicle, the vehicle is already raised on a jack so that the wheel being replaced is clear off the ground. The new wheel must be lifted from the ground to align the studs of the axle-spindle on the vehicle to the holes in the rim of the wheel. This operation is somewhat relatively difficult where the person doing this task is kneeled down, holding the wheel at arm's length, to manipulate the wheel into the wheel well of the vehicle. The final positioning of a wheel on the studs of an axle-spindle of a vehicle constitutes the principal objective of the present invention.

Various devices have been developed in the past to assist a mechanic during the working of a wheel onto a vehicle. In a first group of prior art wheel lifting devices, the following inventions were found: CA Patent 200,020 issued to L. R. Schmertz on May 11, 1920. This document describes a handle with a pair of hooks affixed to the handle. The hooks are fitted under a tire to be mounted on a rim. The handle is used to lift the tire with one hand and to place it on the rim of the wheel. CA Publication 2,105,036 by R. Marcou on Feb. 28, 1995. This document describes a pry bar that can be used to lift a wheel off the ground and to align it with the studs of the axle-spindle.

A second group of wheel lifting devices comprises tray-like wheel supports that are raised and lowered by ratchet-type actuators:

U.S. Pat. No. 3,292,902 issued to M. F. Lynch on Dec. 20, 1966;
U.S. Pat. No. 6,098,961 issued to R. Gionet on Aug. 8, 2000;
U.S. Pat. No. 6,860,496 issued to W. J. Novak et al. on Mar. 1, 2005;
U.S. Pat. No. 8,910,957 issued to C. C. Hassell on Dec. 16, 2014;
CA Patent 2,032,119 issued to M. A. Painter on Feb. 27, 1996;
CA Patent 2,325,175 issued to C. C. Rawlings on May 5, 2001.

In a third group of wheel lifting mechanisms, the following documents provide a good representation of the current status of this technology.

U.S. Pat. No. 1,275,716 issued to H. E. Maurer, Jr., on Aug. 13, 1918;
U.S. Pat. No. 1,361,889 issued to W. J. Miller et al., on Dec. 14, 1920;
U.S. Pat. No. 2,332,443 issued to R. L. Foringer on Oct. 19, 1943;
U.S. Pat. No. 2,349,251 issued to J. J. Domoj on May 23, 1944;
U.S. Pat. No. 2,362,981 issued to C. P. Baum on Nov. 21, 1944;
U.S. Pat. No. 2,380,415 issued to E. R. Carruthers on Jul. 31, 1945;
U.S. Pat. No. 4,690,605 issued to A. V. Coccaro on Sep. 1, 1987;
U.S. Pat. No. 4,692,082 issued to O. O. Smith on Sep. 8, 1987;
U.S. Pat. No. 5,096,161 issued to M. Tomasevic on Mar. 17, 1992;
U.S. Pat. No. 6,789,994 issued to C. Tortellier on Sep. 14, 2004;
U.S. Pat. No. 7,097,406 issued to W. Gang on Aug. 29, 2006;
U.S. Pat. No. 7,232,138 issued to A. R. Shubert on Jun. 19, 2007;
US Publication 2001/0038094 by D. E. Lundy, Sr. Et al. on Nov. 8, 2001;
CA Patent 1,287,041 issued to A. V. Coccaro on Jul. 30, 1991;
CA Publication 2,625,141 by J. Snook on Sep. 27, 2007.

The devices in this last group have a pair of rollers on which a wheel is supported. The rollers are pulled toward each other to raise the wheel, and pushed away to lower the wheel. The pulling of the rollers is done by pawl and ratchet mechanisms or by threaded rods. Although the use a threaded rod actuator is desirable to obtain finer adjustments, the rollers on which the wheel is supported rotate against the wheel when the lift is operated. The movement of the rollers against the wheel changes the angular orientation of the rim relative to the studs on the axle-spindle, and therefore an angular adjustment of the wheel or the axle-spindle must be repeated every time the wheel is lifted a slight distance.

Common wheel jacks used to change a wheel on a vehicle are not made to raise a vehicle higher than needed. A wheel to be replaced needs to be raised just enough to get it off the ground, to slide it from the axle-spindle and to install a spare wheel at its place. When the jack is extended beyond this point, to its full height for example, it become unstable and is easily tilted, with hazardous consequences. Some of the wheel support devices of the prior art are relatively thick and their use requires an extension of a wheel jack at heights that are considered unstable.

Another group of the wheel support devices of the prior art are operated by ratchet and pawl actuators, wherein the position of the wheel with the pawl in one notch is below the required placement and with the pawl in the next notch, the wheel is above the desired level. The wheel still needs to be manipulated by hand to place it correctly on the studs of the axle-spindle.

In view of these observations and inconveniences, it is believed that a market exits for a better wheel positioning lift that has a low profile and that is capable of fine adjustments while maintaining stable the angular orientation of the wheel.

SUMMARY OF THE PRESENT INVENTION

In the present invention, there is provided a tire lift caddy that has a pair of rollers to support a vehicle wheel. The rollers move in a same direction during lifting without affecting the angular position of the wheel relative to the axle-spindle.

In a first aspect of the present invention, there is provided a tire lift caddy comprising a rectangular frame supported on casters. The rectangular frame has inclined slots in the sides thereof, and a pair of rollers mounted in the rectangular frame across a width of the rectangular frame. The rollers have a respective axle therein and each of the axles is guided along a respective pair of the inclined slots. A threaded rod extends along a length of the rectangular frame. A pair of push bar assemblies are mounted to the threaded rod and to the axles of the rollers for moving the rollers in unison along the slots upon a rotation of the threaded rod. The threaded rod has an ACME left-hand, 8 thread-per-inch thread pitch, thereon and a cylindrical handle on an working end thereof. The cylindrical handle can be worked with the palm of the hand, or finely adjusted with the fingers such as with a machinist's micrometer for example, to raise or lower the rollers to a desired level.

In another aspect of the present invention, each of the rollers have a central groove in a surface thereof for nesting the threaded rod therein when the rollers are in their lowermost positions. Because of these grooves, the tire lift caddy according to the present invention has a very low profile for working a wheel on a vehicle without jacking the vehicle to an unstable height.

This brief summary has been provided so that the nature of the invention may be understood quickly. A more complete understanding of the invention can be obtained by reference to the following description of the preferred embodiment thereof in connection with the attached drawings.

BRIEF DESCRIPTION OF THE DRAWINGS

The preferred embodiment of the tire lift caddy according to the present invention is described herein below with reference to the attached drawings.

Figure 1:
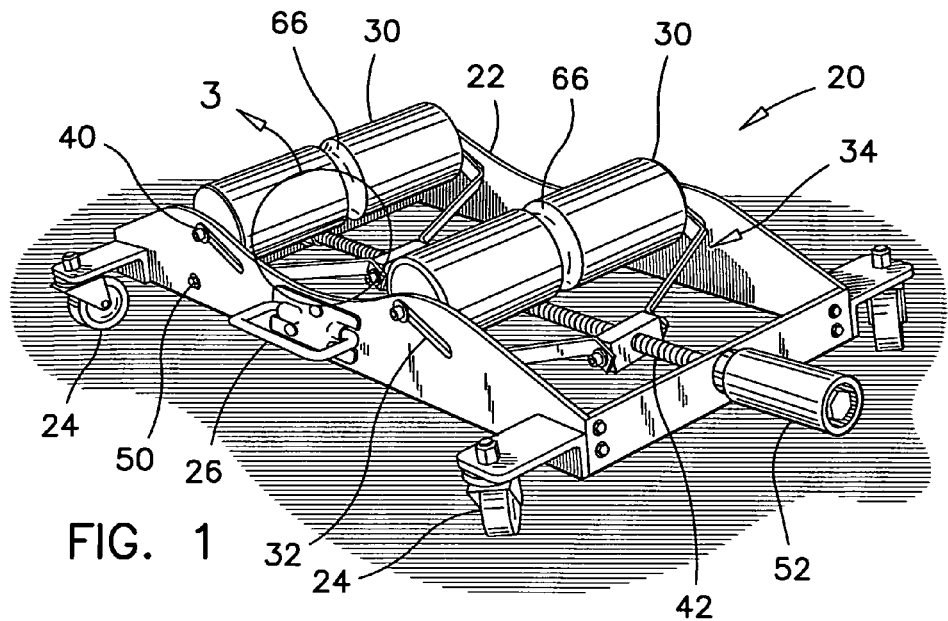
FIG. 1 is a perspective side, top and handle end view of the tire lift caddy according to the preferred embodiment of the present invention.

The drawings presented herein are presented for convenience to explain the functions of all the elements includes in the preferred embodiment of the present invention. Elements and details that are obvious to the person skilled in the art may not have been illustrated. Conceptual sketches have been used to illustrate elements that would be readily understood in the light of the present disclosure. These drawings are not fabrication drawings, and should not be scaled.

DETAILED DESCRIPTION OF THE PREFERRED EMBODIMENT

Referring to FIGS. 1 to 6, the tire lift caddy 20 according to the preferred embodiment of the present invention, comprises a rectangular frame 22 supported on four casters 24. The casters 24 have a low profile and are of the swivel type. Carrying handles 26, one on each side of the frame 22 are usable to carry the preferred tire lift caddy 20 between uses. Preferably the carrying handles 26 are of the flip-down type.

A pair of rollers 30 are mounted inside the rectangular frame 22. Each roller 30 is guided at both ends into a respective inclined slot 32 for movement along the slots. Each roller 30 is driven along a respective pair of slots 32 by a push bar assembly 34. Each push bar assembly 34 is made of a threaded block 36, and a pair of Z-shaped linkage members 38 pivotally mounted to both the threaded block 36 and to the axle 40 of the roller 30 to which the link member 38 is associated.

Figure 3:
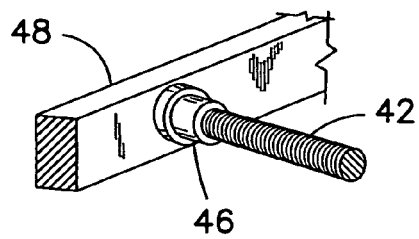
FIG. 3 is a perspective view of the bearing assembly supporting the far end of the threaded rod of the preferred tire lift caddy, located in the circle 3 in FIG. 1.
Figure 4:
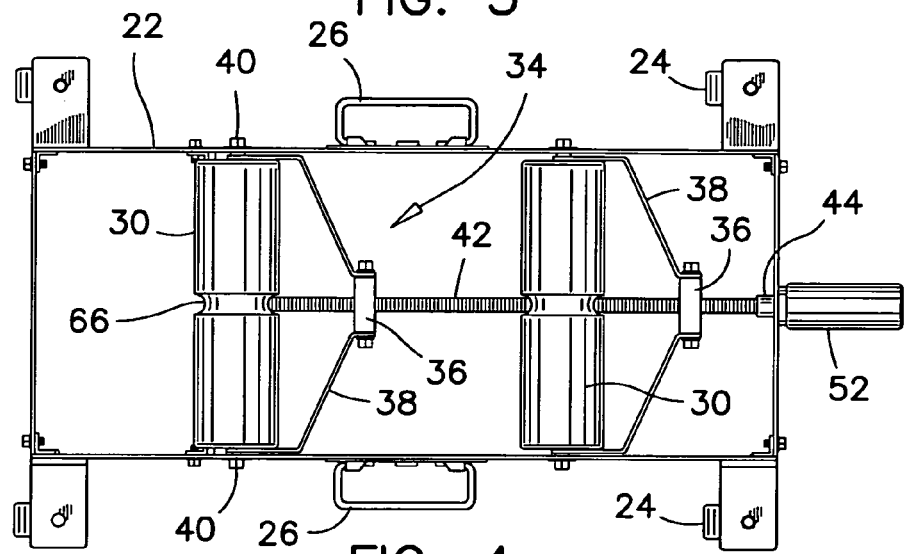
FIG. 4 is a top plan view of the preferred tire lift caddy.
Figure 5:
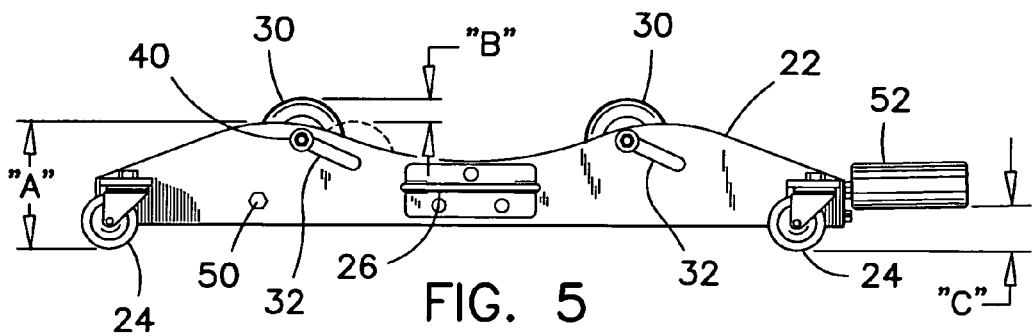
FIG. 5 is a side elevation view of the preferred tire lift caddy.

The threaded blocks 36 are mounted to a threaded rod 42 as can be better seen in FIGS. 1 and 4, and are movable along the rod 42 when the rod is rotated. The threaded rod 42 is supported at its handle end in a first bearing 44, and in its far end into a second bearing 46 mounted to a cross bar 48 as illustrated in FIG. 3. The cross bar 48 is affixed to the frame 22, at attachment points 50, as seen in FIGS. 1 and 5. The bearings 44 and 46 can be ball or roller bearings, but can also be made of bronze, plastic or nylon bushings.

Preferably, the threaded rod 42 has an ACME left-handed 8 thread-per-inch thread pitch. A cylindrical handle 52 is mounted to the working end of the threaded rod 42 and extends horizontally. The length of the handle 52 is preferably 4-5 inches with a diameter of about 1.5 to 1.75 inches to accommodate the palm of a user's hand with ease. In use, when a user turns the cylindrical handle 52 clockwise, the rollers 30 move upward. When the user turns the handle 52 counterclockwise, the rollers move down. When the threaded rod 42 and the threaded blocks 36 are kept well lubricated, a simple rubbing of the hand forward and back on the top of the cylindrical handle 52 causes the rollers 30 to rise and drop. The handle 52 can also be manipulated in fine increments with the fingers, such as with a machinist's micrometer for example.

Figure 2:
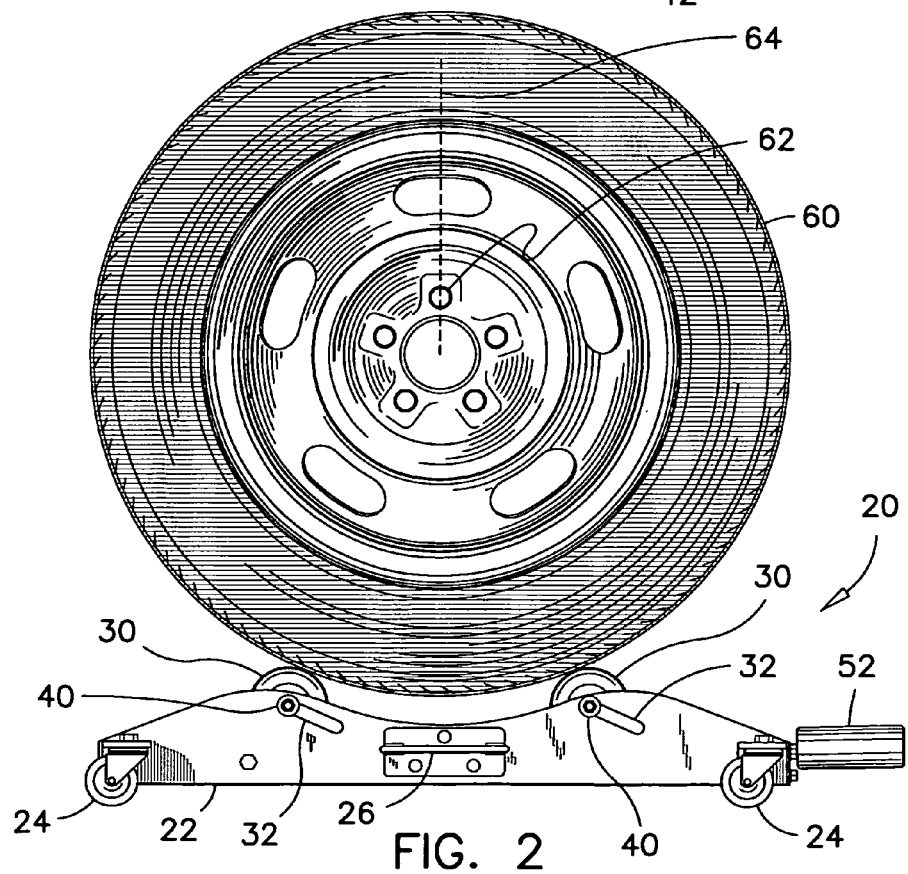
FIG. 2 is an elevation view of the preferred tire lift caddy in use.

In use, a vehicle wheel 60 is rolled over the preferred tire lift caddy 20 as can be appreciated in the illustration in FIG. 2. One of the stud holes 62 is adjusted in an uppermost position along an imaginary vertical line 64.

The handle 52 is worked to adjust the height of the wheel 60 so that the uppermost stud hole 62 can be fitted over a corresponding stud on the axle-spindle of the vehicle (not shown). Both rollers 30 preferably have bearings (not shown) on their respective axles 40 so that the weight of the wheel 60 prevents the rollers 30 from rotating when the axles 40 of the rollers 30 are slid along the slots 32. The vertical alignment 64 of the uppermost stud hole 62 is thereby maintained during the adjustment of the wheel 60 to the axle-spindle.

Figure 6:
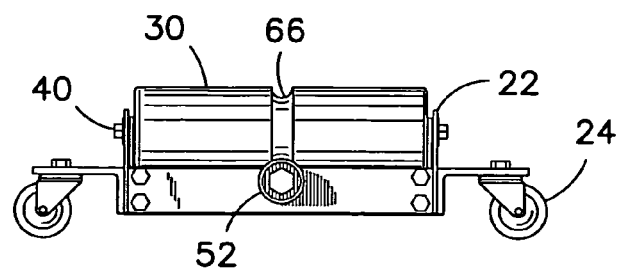
FIG. 6 is a handle end view of the preferred tire lift caddy.

Referring now to FIGS. 1, 4 and 6, both rollers 30 have a circumferential groove 66 around their medial segment. The groove 66 is wider than the diameter of the threaded rod 42 and almost as deep as the threaded rod 42. Both grooves 66 align with the threaded rod 42. Because of the grooves 66, both rollers 30 can be lowered to a point where the threaded rod 42 becomes nested into the grooves 66 of both rollers 30. This feature contributes to obtaining a preferred tire lift caddy 20 that has a relatively low profile. As may be seen in FIG. 5, the total height "A" of the preferred tire lift caddy 20 is about 3-4 inches, when the frame 22 is supported on the casters 24 at about one-half inch above the ground. The diameter of the rollers 30 is preferably about 3 inches, and the total vertical adjustment range "B" of the rollers 30 is about 0.85 to 1.25 inch.

As can be appreciated from the drawings, the cylindrical handle 52 is mounted with a slight inclination, making it working end slightly higher than its far end. The purpose of this inclination is to increase the hand-knuckle clearance "C" as illustrated in FIG. 5, between the handle and the floor surface.

In a preferred manner of utilization of the preferred tire lift caddy 20, a vehicle is jacked up one wheel at the time for replacing the winter tires with summer tires, for example. Each wheel to be replaced is raised just high enough for sliding the tire lift caddy 20 underneath that wheel. Beforehand, the rollers 30 of the tire lift caddy 20 are preferably set to a mid-point along their range of adjustment. The jacked height of the vehicle when the tire lift caddy 20 can be slid under the wheel to be replaced is an ideal height for installation of the replacement wheel. When the wheel to be replaced has been removed, the replacement wheel can be set on the preferred tire lift caddy 20, moved in place and aligned to the axle-spindle of the vehicle with minimum adjustment of the handle 52 of the tire lift caddy 20. The replacement wheel can thereby be installed with minimum effort in a very efficient time.

What is claimed is:

1. A tire lift caddy comprising:
a rectangular frame supported on casters;
said rectangular frame having inclined slots in sides thereof;
a pair of spaced-apart rollers mounted in said rectangular frame across a width of said rectangular frame;
said rollers having a respective axle therein, each of said axles being guided along a respective pair of said inclined slots;
a threaded rod extending along a length of said rectangular frame;
a pair of push bar assemblies mounted to said threaded rod and to said axles of said rollers for moving said rollers in unison along said slots upon a rotation of said threaded rod.

2. The tire lift caddy as claimed in claim 1, further comprising a cylindrical handle on a working end of said threaded rod.

3. The tire lift caddy as claimed in claim 2, wherein said threaded rod has an ACME left-hand 8 thread-per-inch thread pitch thereon.

4. The tire lift caddy as claimed in claim 2, wherein said cylindrical handle extends horizontally and has a length of about 4-5 inch.

5. The tire lift caddy as claimed in claim 4, wherein said cylindrical handle has a diameter of about 1.5 to 1.75 inches, and said cylindrical handle being inclined upward on its working end for increasing a hand-knuckle clearance between said cylindrical handle and a floor surface.

6. The tire lift caddy as claimed in claim 1, further having a carrying handle on a side of said rectangular frame.

7. The tire lift caddy as claimed in claim 1, wherein each of said push bar assembly comprises a threaded block mounted to said threaded rod and a pair of Z-shaped linkage members pivotally mounted to said threaded block and to said axle of a respective one of said rollers.

8. The tire lift caddy as claimed in claim 1, wherein a total height thereof is 3-4 inch.

9. The tire lift caddy as claimed in claim 1, wherein each of said rollers has a central groove in a surface thereof for nesting said threaded rod therein when said rollers are in their lowermost positions.

10. The tire lift caddy as claimed in claim 1, wherein said rollers are mounted on bearings on a respective one of said axle.

11. A tire lift caddy comprising:
a rectangular frame supported on casters;
said rectangular frame having inclined slots in the sides thereof;
a pair of spaced-apart rollers mounted in said rectangular frame across a width of said rectangular frame;
said rollers having a respective axle therein, each of said axles being guided along a respective pair of said inclined slots;
a threaded rod extending along a length of said rectangular frame;
a pair of push bar assemblies mounted to said threaded rod and to said axles of said rollers for moving said rollers in unison along said slots upon a rotation of said threaded rod;
said threaded rod has an ACME left-hand 8 thread-per-inch thread pitch thereon and a cylindrical handle on an working end of said threaded rod.

12. The tire lift caddy as claimed in claim 11 wherein said cylindrical handle extends horizontally and has a length of about 4-5 inch and a diameter of about 1.5 to 1.75 inches.

13. The tire lift caddy as claimed in claim 11, further having a flip-down carrying handle on each side of said rectangular frame.

14. The tire lift caddy as claimed in claim 11, wherein each of said push bar assembly comprises a threaded block mounted to said threaded rod and a pair of Z-shaped linkage members pivotally mounted to said threaded block and to said axle of a respective one of said rollers.

15. The tire lift caddy as claimed in claim 11, wherein a total height thereof is 3-4 inch.

16. The tire lift caddy as claimed in claim 11, wherein each of said rollers is mounted on bearings on one of said axle, and has a central groove in a surface thereof for nesting said threaded rod therein when said rollers are in their lowermost positions.

17. A tire lift caddy comprising:
a rectangular frame supported on casters;
said rectangular frame having inclined slots in the sides thereof;
a pair of spaced-apart rollers mounted in said rectangular frame across a width of said rectangular frame;
said rollers having a respective axle therein, each of said axles being guided along a respective pair of said inclined slots; each of said rollers being mounted on bearings on one of said axles;
a threaded rod extending along a length of said rectangular frame;
a pair of push bar assemblies mounted to said threaded rod and to said axles of said rollers for moving said rollers in unison along said slots upon a rotation of said threaded rod; each of said push bar assemblies comprising a threaded block mounted to said threaded rod and a pair of Z-shaped linkage members pivotally mounted to said threaded block and to said axle of a respective one of said rollers;
said threaded rod has an ACME left-hand 8 thread-per-inch thread pitch thereon and a cylindrical handle on an working end of said threaded rod;
said cylindrical handle extends horizontally and has a length of about 4-5 inch and a diameter of about 1.5 to 1.75 inches;
each of said rollers having a central groove in a surface thereof for nesting said threaded rod therein when said rollers are in their lowermost positions.

18. The tire lift caddy as claimed in claim 17, further having a carrying handle on each side of said rectangular frame.

* * * * *